United States Patent [19]
Jenkins et al.

[11] Patent Number: 5,428,698
[45] Date of Patent: Jun. 27, 1995

[54] SIGNAL ROUTING DEVICE

[75] Inventors: Richard M. Jenkins; John M. Heaton, both of Worcester, United Kingdom

[73] Assignee: The Secretary of State for Defense in Her Britannic Majesty's Government of the United Kingdom of Great Britain and Northern Ireland, London, England

[21] Appl. No.: 294,249

[22] Filed: Aug. 24, 1994

Related U.S. Application Data

[63] Continuation of Ser. No. 64,035, filed as PCT/GB91/02130, Dec. 2, 1991, abandoned.

[30] Foreign Application Priority Data

Dec. 20, 1990 [GB] United Kingdom ............... 9027656

[51] Int. Cl.⁶ .............................................. G02B 6/26
[52] U.S. Cl. .................................... 385/27; 385/3; 385/46; 385/125
[58] Field of Search ............... 385/27, 3, 14, 15, 24, 385/28, 49, 46, 48, 132, 125, 133

[56] References Cited

U.S. PATENT DOCUMENTS

| | | | |
|---|---|---|---|
| 3,563,630 | 2/1971 | Anderson et al. | 385/132 |
| 3,750,183 | 7/1973 | Drabowitch | 385/24 |
| 3,832,029 | 8/1974 | Bryngdahl | 385/133 |
| 4,087,159 | 5/1978 | Ulrich | 385/115 |
| 4,150,870 | 4/1979 | d'Auria | 385/115 |
| 4,652,290 | 3/1987 | Cho et al. | 385/132 |
| 4,758,060 | 7/1988 | Jaeger et al. | 385/3 |
| 4,840,447 | 6/1989 | Kataoka | 385/37 |
| 4,950,045 | 8/1990 | Bricheno et al. | 333/786 |
| 4,975,237 | 12/1990 | Brown | 356/338 |
| 5,091,986 | 2/1992 | Arii et al. | 385/49 |
| 5,239,598 | 8/1993 | Wight et al. | 385/8 |

FOREIGN PATENT DOCUMENTS

| | | |
|---|---|---|
| 0330457A3 | 8/1989 | European Pat. Off. |
| 0330539 | 8/1989 | European Pat. Off. |
| 0395060 | 10/1990 | European Pat. Off. |
| 2634288 | 1/1990 | France |
| 63-68825 | 3/1988 | Japan ........................ 385/3 |
| 1525492 | 9/1978 | United Kingdom |
| 2207525 | 2/1989 | United Kingdom |

OTHER PUBLICATIONS

Bryngdahl; *Journal of the Optical Society of America*, vol. 63, No. 4, Apr. 1973; pp. 416–419.

Fielding et al.; European Conference on Optical Communications, 1989; pp. 17–21.

(List continued on next page.)

*Primary Examiner*—Rodney B. Bovernick
*Assistant Examiner*—John Ngo
*Attorney, Agent, or Firm*—Nixon & Vanderhye

[57] ABSTRACT

A signal routing device (10) incorporates a multimode beamsplitter waveguide (20) connected by a set of parallel relay waveguides (22) to a multimode recombiner waveguide (24). Each relay waveguide (22) contains a respective electro-optic phase shifter (36). Sets of input and output waveguides (18, 28) are connected to the beamsplitter and recombiner waveguides (20, 24) respectively. The input and output waveguides (18, 28) are periodically spaced at off-center positions across the respective multimode waveguide transverse cross-section associated therewith. Radiation in any one of the input waveguides (18) is distributed between the relay waveguides (22) by virtue of modal dispersion in the beamsplitter waveguide (20). The phase shifters (36) apply a set of phase shifts to the distributed radiation. Modal dispersion in the recombiner waveguide (24) results in the phase shifted radiation providing a non-zero input to one or more of the output waveguides (28). Different sets of phase shifts provide for radiation in any one of the input waveguides (18) being transferred selectably to any one or more of the output waveguides (28), as required for selectable signal routing.

28 Claims, 8 Drawing Sheets

OTHER PUBLICATIONS

Jansen et al; *Applied Physics Letter* 55 (19), Nov. 1989; "Diffraction-limited Operation from monolithically integrated diode laser array and self-imaging (Talbot) cavity;" pp. 1949–1551.

Simon et al.; Applied Physics Letters, vol. 31, No. 2, Jul. 1977; "Fiber-optical interferometer"; pp. 77–79.

Niemeier et al.; Optics Letters, vol. 11, No. 10, Oct. 1986; "Quadrature outputs from fiber interferometer with 4X4 coupler"; pp. 677–679.

Croston et al.; IEEE Photonics Technology Letters, vol. 2, No. 10, Oct. 1990; "A Highly Dispersive Wavelength Division Demultiplexer in InGaAlAs—InP for 1.5 $\mu$m Operation"; pp. 734–737.

Drabowitch; Microwave Journal; vol. 9, No. 1, Jan. 1966; "Multimode Antennas"; pp. 41–51.

Laakmann et al.; Applied Optics, vol. 15, No. 5, May 1976; "Waveguides: characteristic modes of hollow rectangular dielectric waveguides"; pp. 1334–1340.

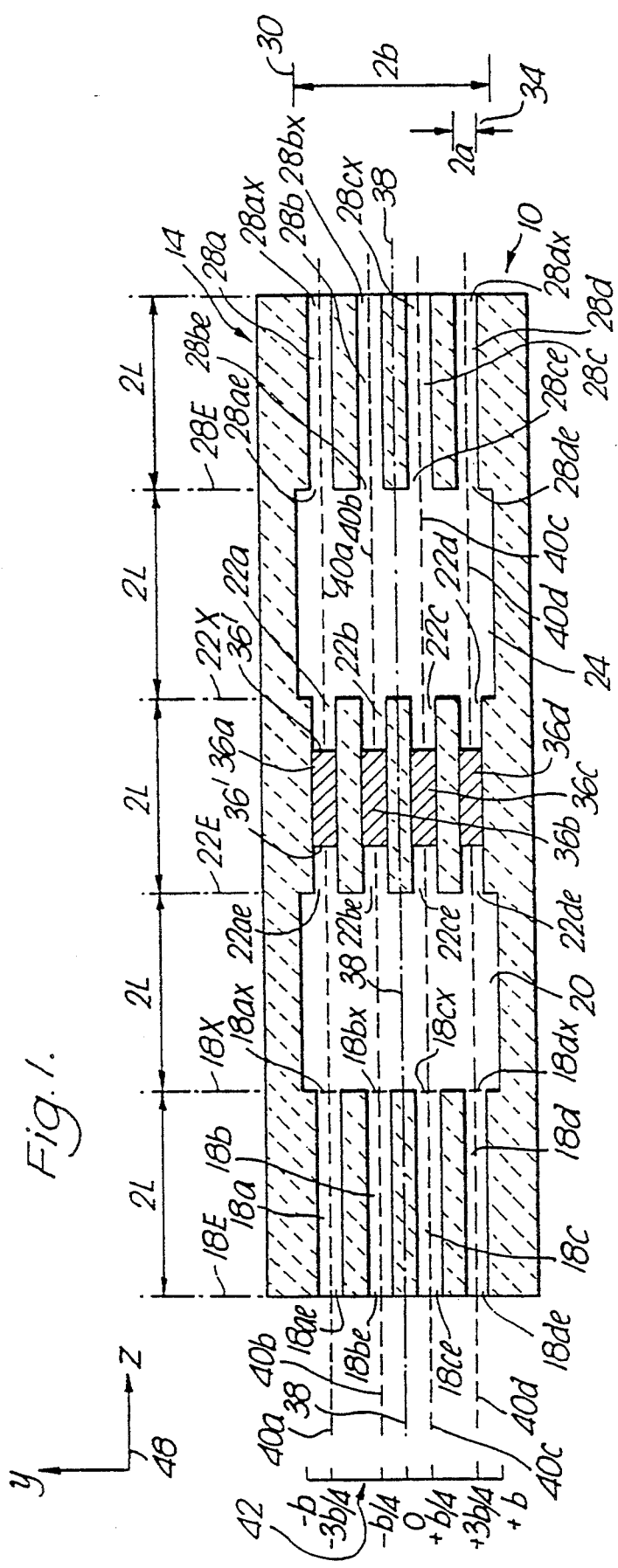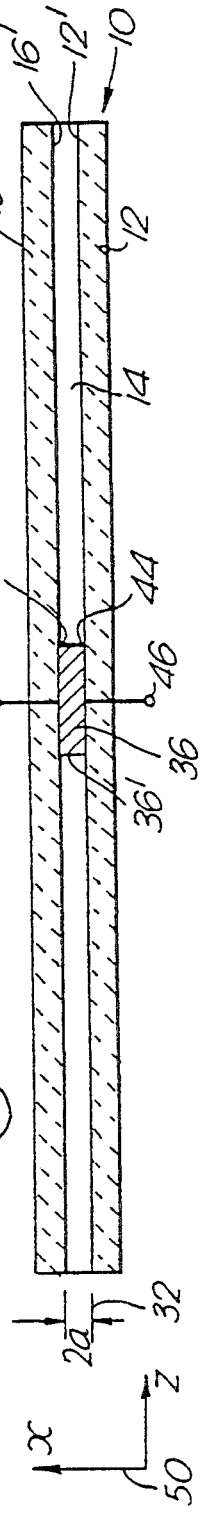

SIGNAL ROUTING DEVICE

This is a continuation of application Ser. No. 08/064,035, filed May 19, 1993, now abandoned, which is a 371 of PCT/GB91/02130 filed Dec. 2, 1991.

BACKGROUND OF THE INVENTION

1. Field of the Invention

This device relates to a signal routing device, and more particularly to such a device for routing a signal selectably to any one of a set of outputs.

2. Discussion of Prior Art

Signal routing devices such as multiway switches are well known for use at DC and conventional electronic frequencies. However, related devices for use at visible, infra-red and microwave frequencies are much more difficult to implement. One such device is disclosed in Patent Co-operation Treaty Application Number PCT/GB88/00928 published as WO89/04988 on Jun. 1st, 1989. It relates to a phased array of electro-optic waveguides. It produces an output beam (main diffraction lobe) which is steerable across a set of outputs by varying bias voltages applied to individual waveguides. The mode of operation employs radar phased array principles. This device is unfortunately characterised by appreciable radiation losses and consequent inefficiency. It is necessary to provide inputs to each of the waveguides, which involves flooding a common input region with radiation. Much of this radiation does not pass down any waveguide. Moreover, the phased array output includes unwanted sidelobes (subsidiary diffraction maxima) corresponding to wasted signal.

An optical gate matrix switch capable of switching any input line to any output line is described by A Himeno, H Terui and M Kobayashi in "Guided Wave Optical Gate Matrix Switch", Journal of Lightwave Technology, Vol. 6, No 1, (1988) pages 30–35. The matrix switch is constructed by integrating InGaAsP laser diode gates with high silica guided wave splitter and recombiner circuits. It is designed for operation with light of wavelength 1.35 $\mu$m. The four input, four output device described has overall dimensions of 10 mm by 25 mm, and an estimated loss of up to 22.6 dB. It therefore suffers from the following disadvantages: a relatively high level of complexity, large size and high optical loss. Indeed amplifiers in the output lines are described as necessary for most potential applications.

A further waveguide signal routing device is described by R Ulrich in UK Patent 1 525 492. The device incorporates q input waveguides feeding a first multimode self-imaging waveguide, which is connected, via q multimode relay waveguides to a second multimode self-imaging waveguide, which has q output guides connected to it. Here q is a positive integer. The self imaging waveguides are of rectangular cross-section and provide for energy efficient beam division and recombination. The relay waveguides are self-imaging, are of square cross-section and contain phase shifters.

Radiation input via one of the input waveguides is, by virtue of modal dispersion within the first self-imaging waveguide, directed to the q relay waveguides. Each relay waveguide receives 1/q of the input radiation. The phase shifters are employed to alter the relative phases of the radiation in the relay waveguides. The phases are altered such that when the radiation passes to the second self-imaging waveguide it is, by virtue of modal dispersion recombined and directed to a chosen one of the output waveguides.

For the device to operate as described above the first and second self-imaging waveguides and the relay waveguides must be of appropriate lengths. The lengths are given by the equation $$L = \frac{4hW^2}{\lambda} \tag{1}$$

where:
  h is a parameter which varies with the function of the waveguide, as discussed below;
  W is the transverse width of the waveguide; and
  $\lambda$ is the wavelength of the radiation in the waveguide.

For the relay waveguides h is an integer. For the first and second self-imaging waveguides h is given by $$h_1 = \frac{p_1}{q} \text{ and } h_2 = \frac{p_2}{q} \tag{2a) and (2b}$$

respectively, where q is the degree of splitting or recombination as appropriate; q does not equal 1, and $p_1$ and $p_2$ have integral values which are prime relative to q.

The prior art device described in UK Patent No. 1525 492 therefore suffers from the disadvantage that its length is constrained. That is the first and second self-imaging waveguides and the relay waveguides have to be of particular lengths and the device therefore has a minimum length beyond which it cannot be reduced. In addition, in order to operate as described, the device requires of the order of fifty waveguide modes to be supported within it. The production of waveguides capable of supporting such a large number of modes is both difficult and expensive.

SUMMARY OF THE INVENTION

It is an object of the invention to provide an alternative form of signal routing device.

The present invention provides a signal routing device including:
  (a) a multimode waveguide arranged to divide the intensity of radiation input to it between each of a set of relay waveguides,
  (b) phase shifting means arranged to provide for radiation within each relay waveguide to have variable phase relative to that of radiation within the other relay waveguides in each case, and
  (c) radiation redirecting means arranged to provide for radiation within the relay waveguides to become redistributed,
characterised in that
  the multimode waveguide is arranged to receive input radiation from at least one subsidiary waveguide arranged for fundamental mode operation, and
  the relay waveguides are each arranged for fundamental mode operation.

The invention provides the advantage that it maybe constructed such that it is shorter than equivalent prior art devices (assuming like waveguide media are employed). Unlike the prior art, the relay waveguides are not constrained in length by self-imaging requirements because they are arranged for fundamental mode operation. This improves design freedom and allows compactness. In many applications, particularly in integrated optical signal processing, the availability of devices of reduced size is of great importance.

Moreover, radiation propagating in the or each subsidiary waveguide in fundamental mode becomes imaged or mapped onto a respective input aperture of each relay waveguide by modal dispersion within the multimode waveguide. This provides for fundamental mode propagation in the or each subsidiary waveguide to give rise to like propagation in each relay waveguide.

The relay waveguides and the or each subsidiary waveguide may be arranged for fundamental mode operation by virtue of being constructed to provide for propagation of the fundamental mode only, higher order modes being attenuated and/or subject to loss from the waveguides. Alternatively, this fundamental mode operation may be arranged by the nature of the respective input excitation to each of the relay and subsidiary waveguides, such that only the fundamental mode of radiation propagation becomes excited therein. In the latter case, the relay waveguides are presented with appropriate input excitations by the multimode waveguide.

In one embodiment of the invention, the multimode waveguide is a first such waveguide and the radiation redirecting means comprises a second such waveguide connected to a set of output ports.

The invention may incorporate a single subsidiary waveguide connected coaxially to the first multimode waveguide, the latter being arranged for symmetric mode excitation only. Alternatively, a set of subsidiary waveguides maybe employed, these being arranged to excite both symmetric and antisymmetric modes of the first multimode waveguide. Such devices may have sets of subsidiary waveguides, relay waveguides and output ports of like cross-section and first and second multimode waveguides of like dimensions.

A device of the invention may alternatively incorporate radiation redirecting means comprising reflecting means arranged to provide for radiation to return through the relay waveguides for a second transit of the multimode waveguide.

A device of the invention may be constructed from successively disposed strata, the various waveguides having axes which are substantially parallel and coplanar. It may comprise hollow waveguides of metal or material such as $Al_2O_3$, BeO, Si, or Macor for use with $CO_2$ laser radiation. Alternatively, it may be constructed from a semiconductor material system such as $Al_xGa_{1-x}As$ for use at visible or near infra-red wavelengths.

BRIEF DESCRIPTION OF THE DRAWINGS

In order that the invention might be more fully understood, embodiments thereof will now be described, by way of example only, with reference to the accompanying drawings, in which:

FIGS. 1 and 2 are respectively sectional plan and side views of a signal routing device of the invention;

DETAILED DESCRIPTION OF PREFERRED EMBODIMENTS

Figure 3:
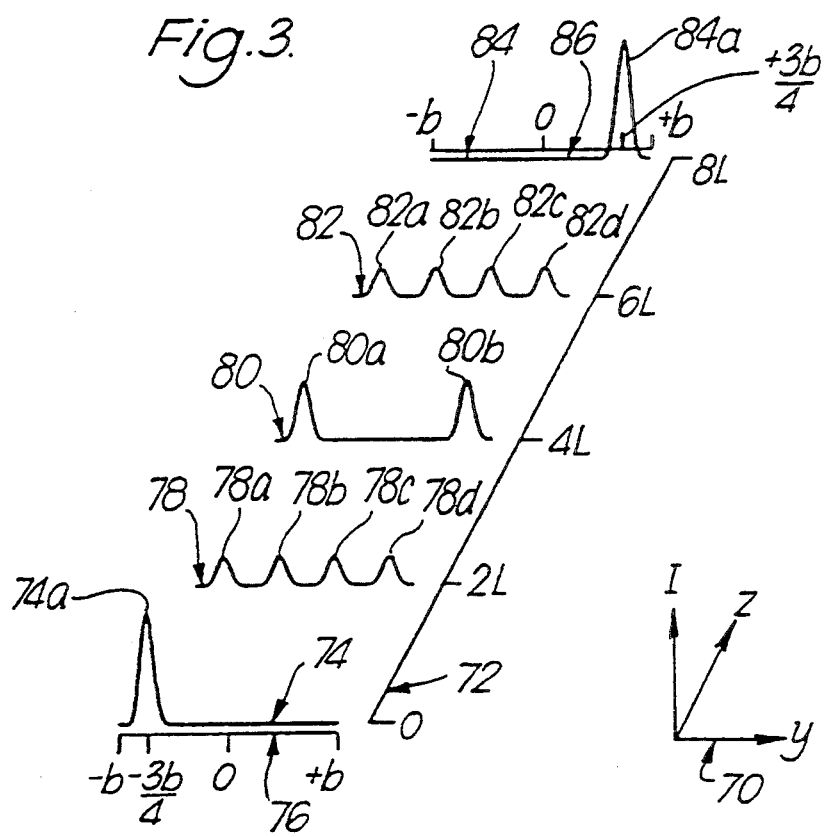
FIG. 3 illustrates transverse electric field intensity distributions at a number of longitudinal positions in a multimode waveguide.

Referring to FIG. 1, there is shown in plan a central horizontal section of a signal routing device of the invention indicated generally by 10. A vertical sectional view of the device 10 is shown in FIG. 2.

The routing device 10 is formed from three parallel-surfaced sheets of alumina ceramic material, these being a base sheet 12, a central sheet 14 and a cover sheet 16.

As shown in FIG. 1, the central sheet 14 is slotted by milling through its thickness. This defines four input waveguides 18a to 18d, a beamsplitter waveguide 20, four relay waveguides 22a and 22d, a recombiner waveguide 24, and four output waveguides 28a and 28d. The input, relay and output waveguides will be referred to collectively in each case as 18, 22 and 28 respectively. All the waveguides 18 to 28 have side walls (not shown) defined by flat surfaces milled in the central sheet 14. They have upper and lower walls (not shown) provided respectively by a lower surface 16 of the cover plate 16' and an upper surface 12' of the base sheet 12.

The beamsplitter and recombiner waveguides 20 and 24 are of rectangular cross-section, both being 2b in width and 2a in height as indicated by scales 30 and 32. Here a and b are parameters which may vary between different embodiments of the invention. In the device 10, b=8a. As indicated by the scale 34 in addition to the scale 32, the input, relay and output waveguides 18, 22 and 28 are of square section with side 2a. The output waveguides 28 act as radiation output ports. All the waveguides 18 to 28 are of length 2L, L being given by:

$$L=2nb^2/\lambda_o \quad (3)$$

where $\lambda_o$ is a free-space operating wavelength of the device 10 and n is the refractive index of the medium within the rectangular waveguides 20 and 24. Since the waveguides 20 and 24 are hollow and air filled, n=1.

The relay waveguides 22 contain electro-optic phase shifters 36a to 36d referred to collectively as 36. The shifters 36 have antireflection coatings such as 36' on their longitudinal ends.

The beamsplitter and recombiner waveguides 20 and 24 are coaxial, their common axis being indicated by a dotted line 38. The input waveguides 18a to 18d are coaxial with respective relay waveguides 22a to 22d and respective output waveguides 28a to 28d; ie input waveguide 18y has a central longitudinal axis 40y common to relay and output waveguides 22y and 28y, where y=a,b,c or d. The axes 40a to 40d are referred to collectively as 40. They are located centrally of respective quarters of the transverse cross-sections of the beamsplitter and recombiner waveguides 20 and 24, as indicated by an axis scale 42 in FIG. 1.

The scale 42 is calibrated for the width ($2b$) of the beamsplitter and recombiner waveguides 20 and 24. It has a zero position on these waveguides' axis 38. Scale positions $-3b/4$, $-b/4$, $+b/4$ and $+3b/4$ locate the input, relay and output waveguide axes 40a to 40d respectively. These positions are located centrally of beamsplitter and recombiner waveguide quarters defined by scale intervals $-b$ to $-b/2$, $-b/2$ to 0, 0 to $+b/2$ and $+b/2$ to $+b$ respectively of which $-b/2$ and $+b/2$ are not shown. The axes 40 are therefore located periodically (in the spatial sense) across the transverse cross-sections of the waveguides 20 and 24.

The input waveguides 18a to 18d have respective entrance apertures 18ae to 18de and exit apertures 18ax to 18dx located in planes 18E and 18X orthogonal to the axis 38. Similarly, the relay waveguides 22a to 22d have entrance and exit apertures 22ae to 22de and 2ax to 22dx in planes 22E and 22X, and the output waveguides 28a to 28d have entrance and exit apertures 28ae to 28de and 28ax to 28dx located in planes 28E and 28X.

As shown in FIG. 2, each of the phase shifters 36 has a respective pair of electrodes 44 on its upper and lower surfaces, and each of the electrodes 44 has a respective bias terminal 46. The section on which FIG. 2 is taken is a plane perpendicular to that of FIG. 1 through any one of the axes 40.

For the purpose of analysis of the operation of the device 10, Cartesian co-ordinate axes are shown at 48 and 50. The z axis is the device's longitudinal axis 38. The x and y axes are transverse vertical and transverse horizontal respectively. The scales 48 and 50 indicate yz and xz planes of the FIGS. 1 and 2 sections respectively; $x=0$ and $y=0$ are on the z axis.

FIG. 3 provides graphs of transverse electric field intensity distributions calculated for a reference waveguide (not shown). This waveguide is 8 L in length, four times that of the beamsplitter and recombiner waveguides 20 and 24, but it has the same transverse cross-section as each of the latter. Each intensity distribution shows intensity I as a function of transverse horizontal position y across the reference waveguide, and $x=0$. This is indicated by axes 70. Each distribution is plotted at a respective z value; the latter are spaced at intervals of 2 L along the reference waveguide.

At $z=0$, as shown on a longitudinal scale 72, an intensity distribution curve 74 indicates initial conditions at one end of the reference waveguide. The curve 74 has a maximum 74a centred at $y=-3b/4$ as shown on a transverse scale 76. The maximum 74a is equivalent to radiation propagating as a fundamental mode (a halfcycle of a sine wave) of an input waveguide 18, and is located at a position corresponding to that of the input waveguide 18a. Other than in the region of maximum 74a, the curve 74 is zero.

The maximum 74a is of constant optical phase. It is treated as an input excitation of the reference waveguide. The former produces multimode excitation of the latter. As will be described later in more detail, the reference waveguide modes which are excited have different propagation constants in the longitudinal z direction. In consequence, their phase relationships with respect to one another vary with z. The in-phase input maximum 74a is decomposed into a linear combination of the modes of the reference waveguide at $z=0$, and these modes produce varying intensity distributions as z increases indicating changes in their mutual interference.

The in-phase input maximum 74a at $z=0$ changes at $z=2$ L to a distribution 78. The latter has four maxima 78a to 78d not all of like phase, and which are centred on positions corresponding to input, relay and output waveguide axes 40; ie their centres are at $y=-3b/4$, $-b/4$, $+b/4$ and $+3b/4$ respectively. Between adjacent pairs of maxima, such as 78a and 78b, the curve 78 goes to zero. The phases of maxima 78a to 78d are $-\pi/4$, $\pi$, 0, $-\pi/4$ respectively.

At $z=4$ L, the transverse intensity distribution is shown by a curve 80 having two maxima 80a and 80b centred at y values $-3b/4$ and $+3b/4$. The maxima 80a and 80b are not of like phase. At $z=6$ L, the distribution is shown by a curve 82 having four maxima 82a to 82d. Between adjacent maxima on the curve 82, the intensity is zero. The maxima 82a to 82d are located in the y dimension exactly as maxima 78a to 78d respectively. The radiation phase variations along the curves 78 and 82 differ however. In consequence, the intensity distribution represented by the curve 82 gives rise to a single maximum intensity distribution curve 84 at $z=8$ L. This compares with the change from four to two maxima between curves 78 and 80 over a like change in z, and is due to differing phase conditions.

The single maximum 84a of the curve 84 is centred at $y=+3b/4$ as shown on a scale 86. Elsewhere the curve 84 is zero. It is equivalent to an inversion of the curve 74 about the central $y=0$ position.

If an appropriate respective phase shift were to be applied to each of the maxima 78a to 78d at $z=2$ L, their phases would be made equal to those of maxima 82a to 82d. In this case, the curve 84 intensity distribution would be derived from that of the curve 74 in a length 4 L of reference waveguide instead of 8 L. Consequently, a single input at $y=+3b/4$ may be arranged to give rise to a single output at $y=+3b/4$ by changes of the phases at 78 to those at 82. Similarly, it can be shown that the maximum 74a can be arranged to give rise to an individual maximum (not shown) at any one of the positions $y=+3b/4$, $-b/4$ and $+b/4$ by appropriate phase changes at the maxima 78a to 78d. By extension of this, it can be shown that a single constant phase maximum at any one of the input ($z=0$) locations $y=-3b/4$, $-b/4$, $+b/4$ and $+3b/4$ can be transformed into a single maximum at any one of the output ($z=4$ L) locations $y=-3b/4$, $-b/4$, $+b/4$ or $+3b/4$. This is precisely what is carried out by the device 10.

Referring now also to FIG. 1 once more, radiation is input from a coherent source (not shown) to the entrance aperture of any one of the input waveguides 18. The radiation is arranged to excite the fundamental mode of the chosen input waveguide, such as 18a for example. The input waveguides 18 may support only the fundamental mode of radiation propagation. Alternatively, the input waveguides 18 may be capable of supporting higher order modes of radiation propagation, in which case the input radiation is arranged to excite only the fundamental mode. Radiation propagates along the input waveguide 18a until it reaches the exit aperture 18ax. This gives rise to a constant phase, half-cycle sine wave maximum at the left hand end of the beamsplitter waveguide 20. This maximum is centred on the axis 40a. It becomes divided into four maxima by the 2 L length of the beamsplitter waveguide 20, as described with reference to FIG. 3. The beamsplitter waveguide 20 images the fundamental mode at the exit aperture 18ax onto the entrance apertures 22ae to 22de of the relay waveguides. In consequence, each of the relay waveguides 22 receives input of intensity corresponding to a respective one of the maxima 78a to 78d. The electro-optic phase shifters 36 have respective bias voltages applied thereto to introduce phase shifts into the radiation giving rise to each of these maxima. This converts the phase variation across the right hand end (output) of the beamsplitter waveguide 20 from that of curve 78 to that of curve 82 at the left hand end (input) of the recombiner waveguide 24. The recombiner waveguide 24 produces fundamental mode imaging from the relay waveguide exit apertures 22ax to 22dx to the output waveguide entrance aperture 28dx. Nonzero intensity (corresponding to the maximum 84a) is therefore input to the output waveguide 28d at y=+3b/4. Other output waveguides 28a to 28c receive zero intensity. The recombiner waveguide acts as the means for redirecting radiation leaving the relay waveguides to an output waveguide.

By alteration of the bias voltages of the phase shifters 36, the phase changes they introduce may be selected to provide for fundamental mode radiation in any one of the input waveguides 18 to be switched to any one of the output waveguides 28.

The phase shifts required for operation of the router 10 may be calculated using the mapping matrix (rectangular matrix) in the following equation subscript "in" refers to waveguides 18 in the former situation and waveguides in the latter. Likewise the column matrix bearing the subscript "out" refers to waveguides 22 or 28. The results obtained are tabulated in Table 1.

The device 10 may be employed to route two or more signals from input guides 18 to output guides 28 simultaneously, provided the desired routings form all or part of one of the four compatible combinations given in Table 1. In addition, with appropriately selected phase shifts, a single input from one of the input waveguides 18 may be divided and routed to two, or all four output waveguides 28. The combinations of two output waveguides 28 which may receive output beams are 28a and 28d or 28b and 28c. The phase shifts necessary to achieve these routings are also tabulated in Table 1.

It should be noted that the necessary phase shifts given in Table 1 are relative. For example, a set of phase shifts $-\pi/2$, $\pi$, 0, $+\pi/2$ may also be $-\pi/2+g$, $\pi+g$, $g$, $+\pi/2+g$, where g may taken any value. The phase of the routed beams will, however, vary with the value of g used. This extra degree of freedom, that of adding a common random phase to each phase shift given, in fact makes the use of four variable phase shifters not strictly necessary, since one phase shift can always be arranged to be zero or a convenient constant value relative to which phase is varied. For a number N of relay waveguides, N-1 phase shifters are required.

TABLE 1

Relative phase shifts applied to shifters 36 to achieve desired routing from any one of input waveguides 18a to 18d to one, two or all four output waveguides 18a to 28d.

| Routing from Input Waveguide 18a, 18b, 18c or 18d | | | | Phase Shifts Applied by Shifters 36a, 36b, 36c and 36d to Obtain Associated Routing | | | |
|---|---|---|---|---|---|---|---|
| 18a | 18b | 18c | 18d | 36a | 36b | 36c | 36d |
| to Output Waveguide(s) 28a, 28b, 28c and/or 28d | | | | | | | |
| 28a | 28c | 28b | 28d | $\pi/2$ | 0 | 0 | $\pi/2$ |
| 28d | 28b | 28c | 28a | $-\pi/2$ | 0 | 0 | $-\pi/2$ |
| 28b | 28a | 28d | 28c | 0 | 0 | $\pi$ | $\pi$ |
| 28c | 28d | 28a | 28b | 0 | $\pi$ | 0 | $\pi$ |
| 28a, 28d | 28b, 28c | 28b, 28c | 28a, 28d | 0 | 0 | 0 | 0 |
| 28a, 28d | 28b, 28c | 28b, 28c | 28a, 28d | 0 | $\pi$ | $\pi$ | 0 |
| 28b, 28c | 28a, 28d | 28a, 28d | 28b, 28c | $-\pi/2$ | $\pi$ | 0 | $+\pi/2$ |
| 28b, 28c | 28a, 28d | 28a, 28d | 28b, 28c | $-\pi/2$ | 0 | $\pi$ | $+\pi/2$ |
| 28a,28b,28c,28d | 28a,28b,28c,28d | 28a,28b,28c,28d | 28a,28b,28c,28d | $+\pi/4$ | f | $\pi+f$ | $+\pi/4$ |
| 28a,28b,28c,28d | 28a,28b,28c,28d | 28a,28b,28c,28d | 28a,28b,28c,26d | $+\pi/4$ | f | f | $-3\pi/4$ | f may take any value $$\begin{pmatrix} E_a \\ E_b \\ E_c \\ E_d \end{pmatrix}_{out} = \frac{1}{\sqrt{4}} \begin{pmatrix} e^{-j\pi/4} & -1 & +1 & e^{-j\pi/4} \\ -1 & e^{-j\pi/4} & e^{-j\pi/4} & +1 \\ +1 & e^{-j\pi/4} & e^{-j\pi/4} & -1 \\ e^{-j\pi/4} & +1 & -1 & e^{-j\pi/4} \end{pmatrix} \begin{pmatrix} E_a \\ E_b \\ E_c \\ E_d \end{pmatrix}_{in.}$$

where $E_a$, $E_b$, $E_c$ and $E_d$ represent the electric field complex amplitudes within waveguides 18, 22 or 28 referenced a to d respectively. The rectangular matrix maps the fields within waveguides 18 to the waveguides 22, or the fields within waveguides 22 to the waveguides 28. Therefore the column matrix bearing the The bias voltages to be applied to the phase shifters 36 depend on the material of the latter and the free space operating wavelength $\lambda_o$. Because of its alumina construction, the device 10 is suitable for use with $CO_2$ laser radiation for which $\lambda_o$ is 10.59 microns. Suitable waveguide size parameters are 2b=3 mm and 2a=0.375 mm (since b=8a). The device 10 is hollow, and therefore n=1 in equation (3). The latter may therefore be written:

$$L = 2b^2/\lambda_o. \tag{4}$$

For 2b=3 mm and $\lambda_o$=10.59 microns:

$$L = 1.5 \times 3/1.059 \times 10^{-2} \, mm$$

ie L=425 mm

The length (2 L) of the beamsplitter and recombiner waveguides 20 and 24 is therefore 950 mm in each case. The device 10 has a length (10 L) of 4250 mm.

It should be noted that the lengths of the input, relay and output waveguides (18, 22, 28) do not affect the operation of the device 10 to any appreciable extent (ignoring imperfections). They have been selected to be 2 L for simplicity of design and description. The length 2 L has no particular significance for these waveguides.

The theoretical propagation characteristics of a rectangular waveguide (such as waveguides 20 and 24) will now be analysed. It is assumed that the waveguide has height 2a, width 2b and is bounded by walls of a homogeneous dielectric material with complex dielectric constant $\epsilon$. It is also assumed that these walls are highly reflecting, and do not attenuate propagating waveguide modes significantly. The waveguide has height, width and length dimensions which are parallel to the x, y and z axes respectively. It has normalised linearly polarised modes of the kind $EH_{mn}$. The electric field contribution $E_{mn}$ (x, y, z) of the mnth mode $EH_{mn}$ at the point (x, y, z) has been calculated by Laakmann et al in Appl. Opt. Vol. 15, No. 5, pages 1334–1340, May 1976 as follows:

$$E_{mn}(x,y,z) = \frac{1}{\sqrt{(ab)}} \left[ \begin{array}{c} \cos \\ \sin \end{array} \left( \frac{m\pi x}{2a} \right) \right] \left[ \begin{array}{c} \cos \\ \sin \end{array} \left( \frac{n\pi y}{2b} \right) \right] e^{i\gamma_{mn}z} \quad (5)$$

where
m is the mode number relating to the field dependency along the x axis,
n is the mode number relating to the field dependency along the y axis,
z is the distance along the z axis,
$\gamma_{mn} = (\beta_{mn} + i\alpha_{mn})$, the propagation constant of the $mn^{th}$ mode, $\beta_{mn}$ and $\alpha_{mn}$ being the $mn^{th}$ mode's phase and attenuation coefficients, and
"cos" above "sin" indicates the former applies to even mode numbers (m or n as appropriate) and the latter odd mode numbers.

The phase coefficient $\beta_{mn}$ is given by $$\beta_{mn} = \frac{2\pi}{\lambda} \left[ 1 - \left\{ \left( \frac{\lambda m}{4a} \right)^2 + \left( \frac{\lambda n}{4b} \right)^2 \right\} \right]^{\frac{1}{2}} \quad (6.1)$$

If the negative term in parentheses in equation (6.1) is small compared with unity (paraxial radiation approximation), which is satisfied in practice, then the binomial theorem may be used to rewrite Equation (6.1) as:

$$\beta_{mn} = \frac{2\pi}{\lambda} \left[ 1 - \frac{1}{2} \left\{ \left( \frac{\lambda m}{4a} \right)^2 + \left( \frac{\lambda n}{4b} \right)^2 \right\} \right] \quad (6.2)$$

where a, b, m an n are as previously defined, and $\lambda$ is the wavelength of the radiation propagating in the waveguide.

Equation (5) sets out the electric field contributions obtainable from all linearly polarised modes of a rectangular waveguide. It is calculated on the basis that the electric field contribution of each mode is zero at the side walls of the waveguide, ie at y= +b and −b where y=0 on the axis 38. This is satisfied for waveguides 20 and 24 with reflecting walls. Not all rectangular waveguide modes are necessarily excited by a given input. In the case of the device 10, the heights of the waveguides 18 to 28 are matched and equal to 2a. Any input square section waveguide 18 which is selected to provide input supplies an excitation in the form of its fundamental or lowest order mode $EH_{11}^S$. This is coupled to the various $EH_{mn}$ modes of the rectangular section beamsplitter waveguide 20. The input $EH_{11}^S$ mode consequently becomes decomposed into a linear combination of the $EH_{mn}$ modes with respective complex multiplicative coefficients $A_{mn}$. This is expressed by:

$$EH_{11}^S = \Sigma A_{mn} \cdot EH_{mn} \quad (7)$$

Essentially the $A_{mn}$ amplitude coupling coefficients are the coefficients of a Fourier series which represents the electric field at an input aperture where the relevant input waveguide 18 merges into the beamsplitter waveguide 20. The EHmn modes are mutually orthogonal, and in consequence the coefficients $A_{mn}$ can be calculated from overlap integrals of the form:

$$A_{mn} = \int_{-b}^{+b} \int_{-a}^{+a} EH_{11}^S \cdot EH_{mn} \cdot dy \cdot dx \quad (8)$$

Figure 4:
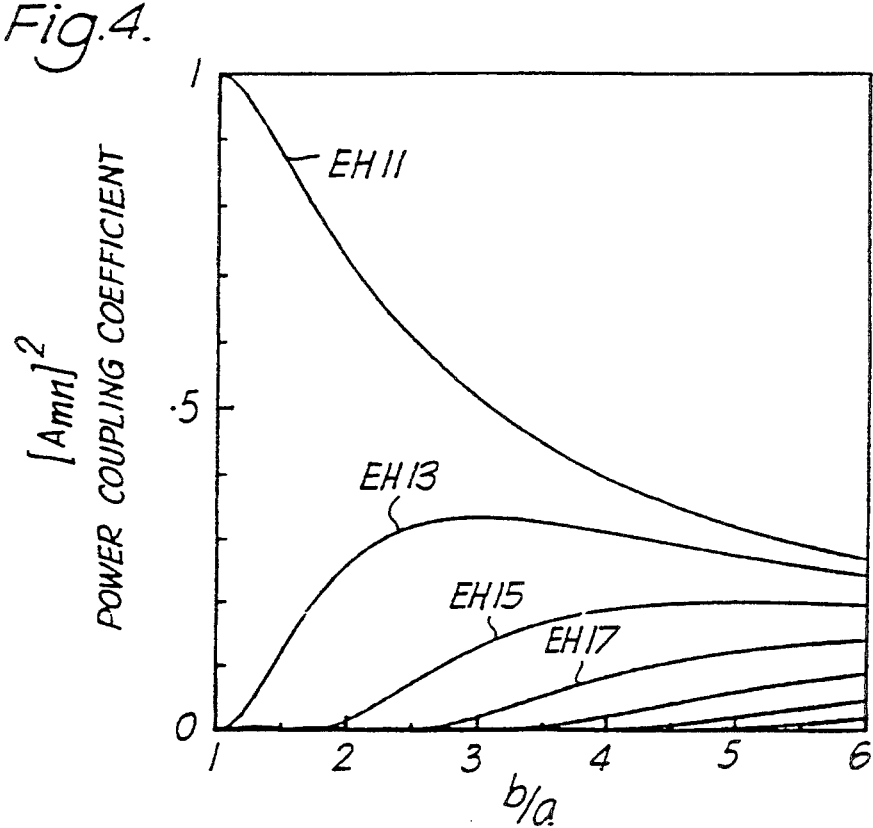
FIG. 4 illustrates the variation of radiation power coupling to waveguide modes as a function of the aspect ratio of a multimode waveguide.

From Equations (5) to (8) it is possible to calculate how the amplitude coefficients of the excited rectangular waveguide modes vary as a function of b/a. The ratio b/a is that of the widths of the central and input waveguides. FIG. 4 illustrates the variation of $|A_{mn}|^2$ with b/a. This shows the effect on power coupling of varying the beamsplitter waveguide width to height ratio. For convenience, FIG. 4 illustrates modal power coupling to the beamsplitter waveguide 20 from an input waveguide (not shown) located coaxially about the device axis 38. FIG. 4 indicates that $A_{mn}=0$ except when m=1 and n is odd. This is because of the axially symmetric nature of the excitation conditions. Consequently, the modes excited are only the symmetric modes $EH_{11}$, $EH_{13}$, $EH_{15}$ etc. Because of waveguide height matching, under these excitation conditions modes for which m>1 are not excited.

Figure 5:
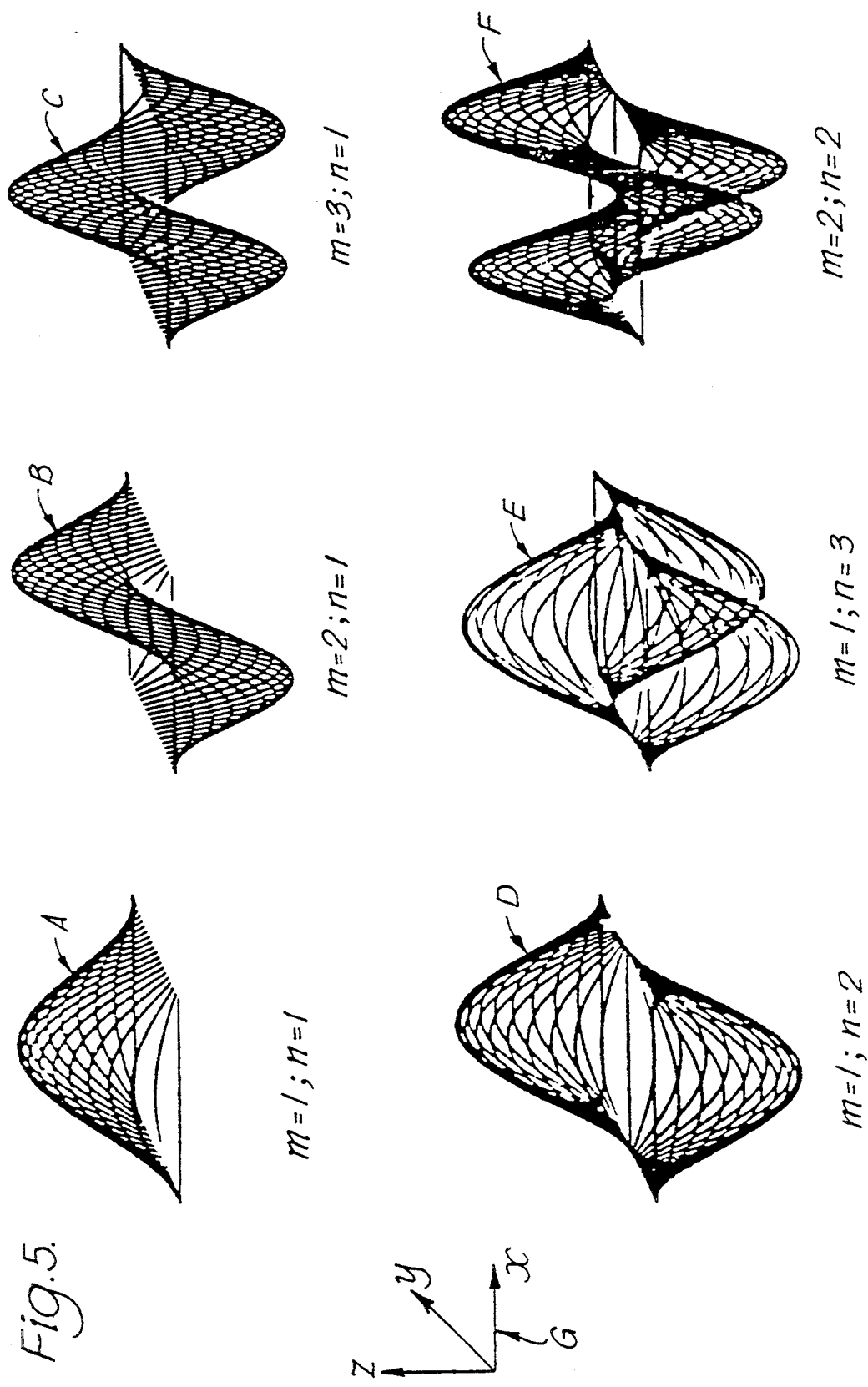
FIG. 5 provides perspective views of waveguide modes.

The forms of some of the lower order $EH_{mn}$ waveguide modes are shown as electric field amplitude distributions in FIG. 5. These were obtained by computation, and are shown as graphs A to F in quasi-three dimensional form. For convenience, the co-ordinate axes shown at G are rotated with respect to the axes 30 in FIG. 1. The axes x, y and z correspond to transverse vertical, transverse horizontal and longitudinal directions in the multimode waveguide 20 as before. The graphs A to F correspond to modes as follows:

A:$EH_{11}$; B:$EH_{21}$; C:$EH_{31}$; D:$EH_{12}$; E:$EH_{13}$; F:$EH_{22}$.

Of these, A, C and E are symmetric modes and B, D and F are antisymmetric modes. To clarify this, let E(x) and E(−x) be respectively the electrical field amplitude distributions on positive and negative parts respectively of the x axis in FIG. 1; E(x=0) is on the z axis 30. Let E(y) and E(−y) be the equivalents for the y axis.

For a symmetric mode:

$$E(x)=E(-x) \text{ and } E(y)=E(-y) \quad (9.1)$$

For an antisymmetric mode, either one of or both of (9.2) and (9.3) below apply:

$$E(x)=-E(-x) \quad (9.2)$$

$$E(y)=-E(-y) \quad (9.3)$$

As illustrated in FIG. 4, with coaxial excitation of the beamsplitter waveguide 20, and when b/a=3, only the modes $EH_{11}$, $EH_{13}$, $EH_{15}$, and $EH_{17}$ are excited. These modes have approximate relative powers 0.52, 0.33, 0.13 and 0.02 respectively. When b/a=6, the modes $EH_{11}$ to $EH_{1,13}$ are excited with respective relative powers from 0.27 to 0.02.

It should be noted that although coaxial excitation of the beamsplitter waveguide 20 excites only symmetric modes, when the phase shifters 36 are employed to introduce phase shifts, both symmetric and antisymmetric modes are excited in the recombiner waveguide 24.

Figure 6:
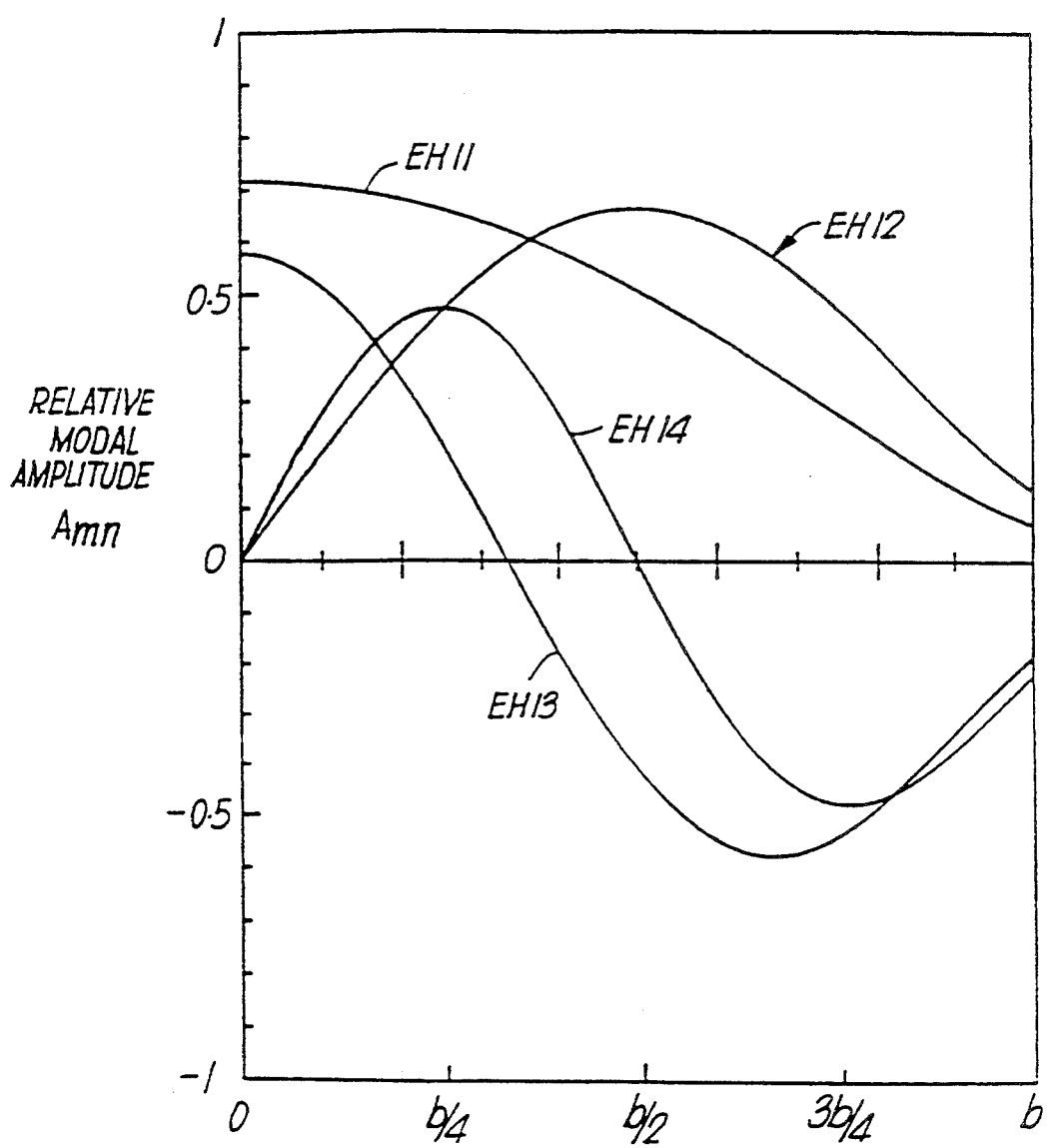
FIG. 6 illustrates the variation in modal amplitudes in a multimode waveguide as a function of input waveguide displacement from a coaxial location.

The effect of displacing the axis 40 of an input waveguide 18 from the z axis 38 is shown in FIG. 6. This provides the relative amplitudes $A_{mn}$ of the waveguide modes $EH_{mn}$ for m=1 and n=1, 2, 3 and 4. At zero offset, ie for coincident axes 38 and 40, the antisymmetric modes $EH_{12}$ and $EH_{14}$ have zero amplitude. $EH_{11}$ and $EH_{13}$, the symmetric modes have relative amplitudes greater than 0.5.As the offset increases, $EH_{11}$ and $EH_{13}$ reduce in amplitude and $EH_{12}$ and $EH_{14}$ increase. There is a maximum in $EH_{12}$ at an offset of b/2. There are positive and negative maxima in $EH_{14}$ at offsets of b/4 and 3b/4. This demonstrates that relative modal amplitudes vary with degree of offset of an input waveguide axis from the device axis 38, the latter being the axis of the beamsplitter waveguide 20.

However, it can be shown that an input waveguide 18 connected at a periodic position with respect to the beamsplitter waveguide's transverse (y) dimension produces a number of periodically located maxima (at relay waveguide entrances). In FIG. 1, the waveguides 18 have axes 40 located centrally of respective quarters of the beamsplitter waveguide 20. Each input waveguide is capable of producing four maxima 78a to 78d. More generally for a beamsplitter waveguide notionally divided longitudinally into N equal subdivisions, an input waveguide coaxial with such a subdivision offset from the axis 38 would produce N periodically spaced maxima distant 8 L/N at the right hand end of the beamsplitter waveguide 20. In consequence, the device 10 may be adapted for any number of inputs. Where they merge into the beamsplitter waveguide, these inputs must have waveguide axes or centres at spatially periodic locations offset from the beamsplitter waveguide axis. The location periodicity or corresponding notional number of subdivisions N sets the required number of relay and output waveguides.

The invention offers the advantage that for routing devices requiring a relatively low degree of splitting, ie a low value of N, the number of modes that the multimode waveguides 20 and 24 must support is small. For instance the electric field distribution illustrated in FIG. 3 may be substantially fully described using the seven lowest order modes, that is $EH_{11}$ to $EH_{17}$. Therefore a device, such as the device 10, with N=4 and a waveguide width to height ratio, b/a=8 need only support the seven lowest order modes. In general the modes required are in the region of the 2N lowest order modes. In prior art self-imaging waveguide propagation of fifty modes is necessary, which constrains waveguide design severely.

Figure 7:
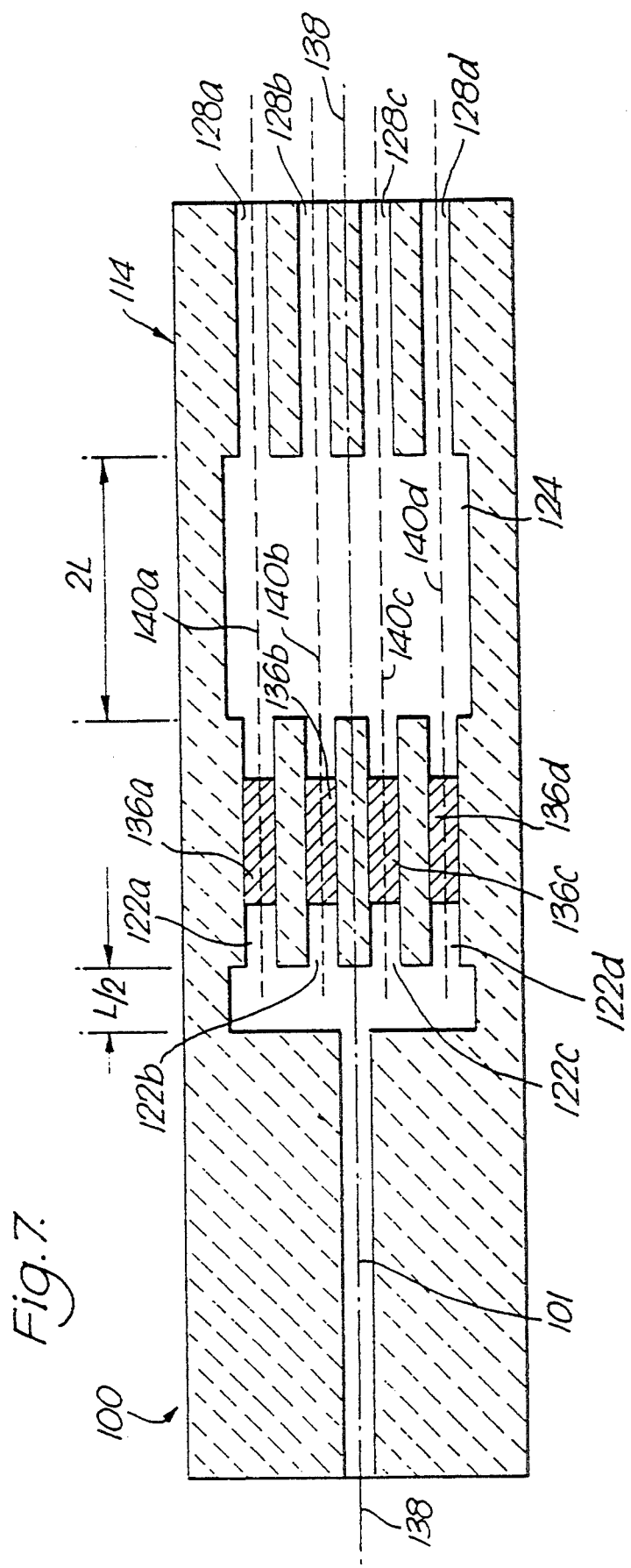
FIG. 7 is a sectional plan view of a routing device of the invention incorporating a coaxial input waveguide and a beamsplitting waveguide arranged for symmetric mode operation.

Referring now to FIG. 7, there is shown an alternative embodiment a signal routing device of the invention indicated generally by 100. In FIG. 7, parts equivalent to those described earlier are like referenced with a prefix 100. The devices 10 and 100 have a number of similarities, and the description of the latter will concentrate on aspects in which it differs from the former.

The device 100 has a single input waveguide 101 which is coaxial with a main device central axis 138. The input waveguide 101 merges into (or is ported to) a beamsplitter waveguide 103, which is also coaxial with the axis 138. The beamsplitter waveguide 103 has the same transverse cross-section (2a×2b) as the corresponding waveguide 20 of FIG. 1, but has relatively reduced length of L/2.

The device 100 incorporates relay waveguides 122a to 122d, a recombiner waveguide 124, output waveguides 128a to 128d, and electro-optic phase shifters 136a to 136d; these are located, aligned and dimensioned equivalently to their similarly referenced counterparts in FIG. 1.

The device 100 operates as follows. Referring to FIG. 6, since there is zero offset of the input waveguide 101 from the axis 138, only symmetric modes ($EH_{1n}$, n odd) of the beamsplitter waveguide 103 are excited. The amplitudes of antisymmetric modes such as $EH_{12}$ and $EH_{14}$ are zero at zero input waveguide offset. By an analysis based on Equations (5) to (6), it can be shown that an axial fundamental mode ($EH_{11}$) input to a rectangular multimode waveguide such as 103 produces splitting into N maxima at a distance 2 L/N; this is subject to the proviso that the multimode waveguide is sufficiently wide for a sufficient number of symmetric modes to be excited to produce the required number of well defined maxima. This in turn requires b/a (as previously defined), the multimode beamsplitter waveguide's width/height ratio, to be adequate. In the device 100 b/a is 8, which is more than adequate to excite $EH_{1n}$ modes (n odd) up to n=15 with significant relative amplitudes greater than 0.05. There are 8 modes for which n is odd and in the range 1 to 15.

For the beamsplitter waveguide 103, the length 2 L/N is L/2, which gives N=4. The fundamental $EH_{11}$ mode input from the input waveguide 101 is consequently divided into four equal intensity maxima at respective entrances of the relay waveguides 122a to 122d. Subsequently, as previously described for the device 10, phase shifts are imposed by shifters 136a etc to produce recombination in the waveguide 124 at one of the output waveguides 128a to 128d.

The device 100 demonstrates that the invention may be implemented in shortened form in applications requiring only a single input.

Whereas the invention has been described in terms of hollow waveguides, solid semiconductor material waveguides may also be employed. For example, Nd-YAG laser radiation is suitable for use with ridge waveguides of the ternary semiconductor material system $Al_xGa_{1-x}As$. Metal microwave waveguides may also be used.

Figure 8:
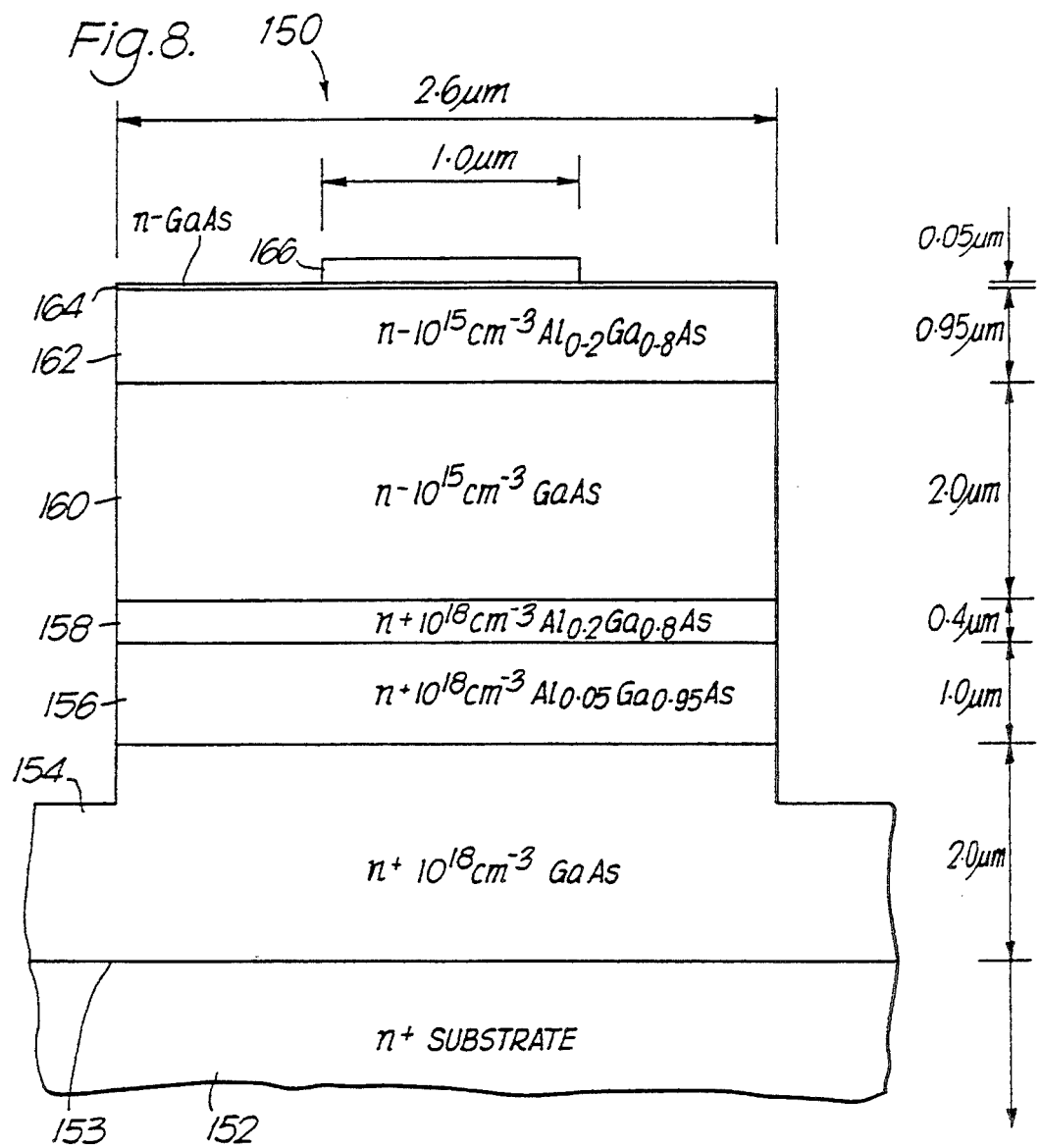
FIG. 8 schematically illustrates the layered structure of a relay waveguide, of a device of the invention, formed from semiconductor material.

Referring now to FIG. 8, a ridge waveguide 150 of the ternary semiconductor material system $Al_xGa_{1-x}As$ is illustrated in cross-section, showing layered construction. The waveguide 150 is a relay waveguide for use in an integrated optical device of the invention. It incorporates a substrate wafer 152 of $n^+$ GaAs of the kind normally used in epitaxially grown devices. The wafer 152 has a front surface 153 and a rear surface (not shown). The substrate wafer 152 bears on its front surface 153 the following upwardly successive layers:

a) an $n^+$ GaAs layer 154 2.0 μm thick;
b) an $n^+$ $Al_{0.05}Ga_{0.95}As$ layer 156 1.0 μm thick;
c) an $n^+$ $Al_{0.2}Ga_{0.8}As$ layer 158 0.4 μm thick;
d) an $n^-$ GaAs layer 160 2.0 μm thick, this being the waveguide core layer;

e) an n⁻ Al$_{0.2}$Ga$_{0.8}$As layer 162 0.95 μm thick; and f) an n⁻ GaAs cap layer 164 0.05 μm thick.

Dopant levels in the layers 154 to 162 are indicated on FIG. 8. In addition the waveguide 150 incorporates an Ohmic contact (not illustrated) of Ni/Ge/Au on the back surface of the substrate wafer 152. Also, a Schottky contact 166 upon the cap layer 164, this being formed from Ti/Pd/Au. As indicated on FIG. 8 the ridge of the waveguide 150 is 2.6 μm in width and the Schottky contact 166 is 1.0 μm in width.

When a voltage is applied to the waveguide 150 via the Ohmic contact and the Schottky contact 166 the layers 152 to 158 conduct and the electric field is across layers 160 to 164. Due to the Pockels effect (linear electro-optic effect) the refractive index of the layers 160 to 164 changes in proportion to the applied electric field. Thus the refractive index of the material in which the radiation propagates, ie the waveguide core layer, is altered, and a phase shift is introduced.

Both multiple input and single input router devices of the invention may be constructed for use with radiation from Nd-YAG lasers, using the layer structure described above. Appropriate dimensions for a selection of devices are given in Table 2. In each case all input, relay and output square waveguides are of width 2.6 μm. Also all Schottky contacts 166, which form electrodes for the shifters are 1 μm wide and 6.0 mm long. They are located centrally on upper surfaces of relay waveguides.

TABLE 2

Appropriate dimensions for a selection of router devices of the invention for use with radiation from Nd-YAG lasers.

| No of input-output waveguides | | Width of splitter & recombiner waveguides | length of splitter waveguide | length of recombiner waveguide |
|---|---|---|---|---|
| Input | Output | (μm) | (μm) | (μm) |
| 1 | 4 | 24 | 472 | 1888 |
| 4 | 4 | 24 | 1888 | 1888 |
| 1 | 6 | 36 | 706 | 2825 |
| 6 | 6 | 36 | 2825 | 2825 |
| 1 | 10 | 50 | 817 | 3269 |
| 10 | 10 | 50 | 3269 | 3269 |

The router devices 10, 100 described earlier incorporate transmissive phase shifters 36, 136, within straight relay waveguides 22, 122. In some circumstances transmissive phase shifters may not be appropriate. In such cases reflective phase shifters, such as moveable mirrors, may be suitable.

Figure 9:
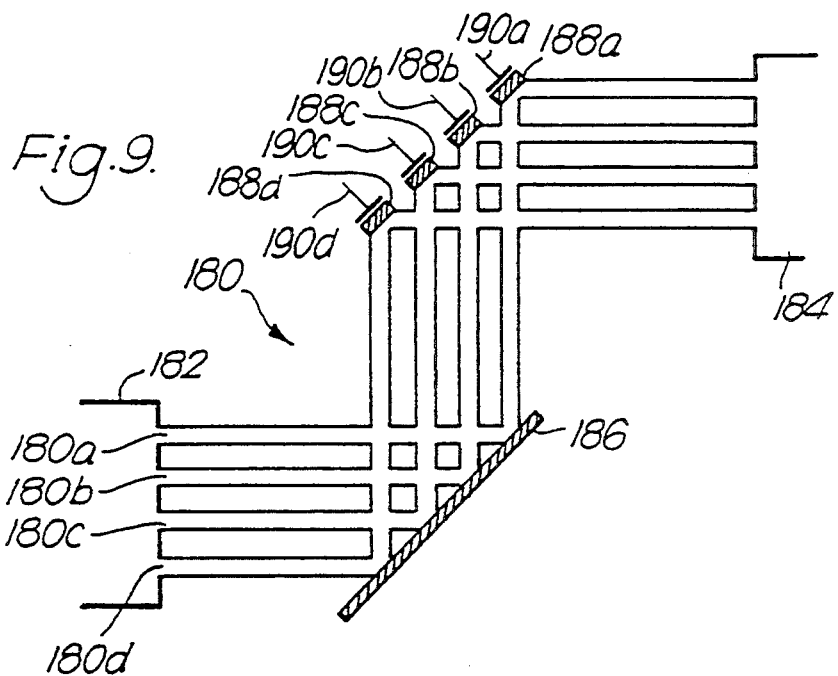
FIG. 9 schematically illustrates alternative relay waveguide construction.

Referring now to FIG. 9, a set of relay waveguides 180 incorporating reflective phase shifters, and suitable for use in devices such as 10 and 100, is illustrated schematically. The set of relay waveguides 180 are referred to individually as 180a to 180d. They provide connection between a splitter waveguide 182 and a recombiner waveguide 184. The waveguides 180 incorporate a fixed mirror 186 and a set of moveable mirrors 188, with associated electromechanical actuators 190 and circuitry of known kind (not shown). The moveable mirrors 188 and actuators 190 are referred to individually as 188a and 188d and 190a to 190d respectively.

Radiation beams within the waveguides 180 are reflected from the fixed mirror 186, pass to respective moveable mirrors 188, are reflected again and pass to the recombiner waveguide 184. Phase shifts are introduced into the radiation beams by movement of the respective moveable mirror 188 using the associated electromechanical actuator 190.

Such relay waveguides 180 will not be applicable in all situations. Firstly, because the waveguides 180 cross each other. In hollow waveguide technology, with guide dimensions large compared with the wavelength of operation, breaks in guide walls do not result in a significant increase in attenuation. Therefore in hollow waveguides such crossings are acceptable. This is not the case in all waveguide technologies. Secondly, electromechanical actuators capable of providing accurate movement to less than a micron are readily available. However, although they may be incorporated into hollow waveguides, they are not readily applicable in layered semiconductors technology.

Figure 10:
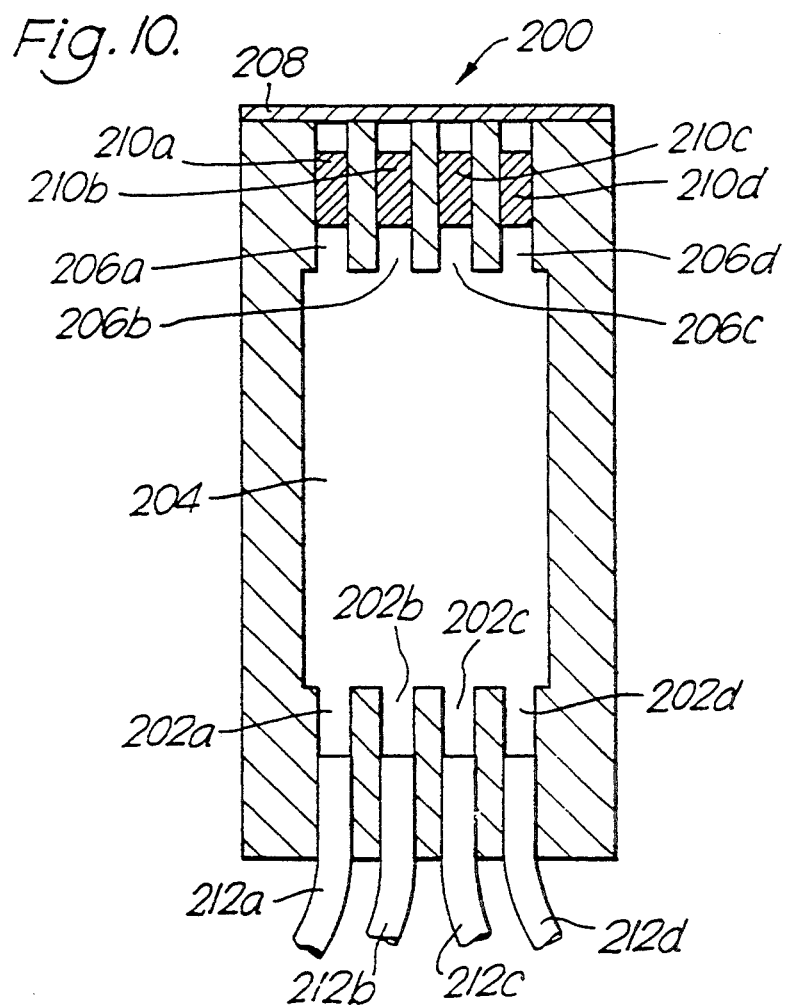
FIG. 10 schematically illustrates a device of the invention in the form of a star coupler.

Referring now to FIG. 10, a device of the invention in the form of a star coupler is illustrated schematically. The star coupler is indicated generally by 200. It incorporates four input/output waveguides 202a to 202d (collectively 202), a multimode waveguide 204, and four relay waveguides 206a to 206d (collectively 206). The relay waveguides 206 are terminated by a reflective surface 208 and they include respective phase shifters 210a to 210d (collectively 210). Optical fibres 212a to 212d (collectively 212) from an optical communications network (not shown) are inserted in input/output subsidiary waveguides 202. The fibres 212 are located appropriately to provide excitation for, and to accept excitation from, the input/output waveguides 202. The multimode waveguide 204 is of height 2a, width 2b and length 2 L.

The device 200 is essentially half the device 10 of FIGS. 1 and 2 with a reflective surface 208 added. It operates as follows. Input radiation providing an optical excitation passes to the multimode waveguide 204 from one of the input/output waveguides 202, which in turn received the excitation via its respective optical fibre 212. The input radiation propagates in fundamental mode in the input/output waveguide. Modal dispersion of this radiation occurs in the multimode waveguide 204, and the radiation is divided into four beams of substantially equal intensity after a distance 2 L. Each of the four beams enters a relay waveguide 206a to 206d, and excites the fundamental mode of that waveguide 206a to 206d. The beams pass through respective phase shifters 210, and become redirected by reflection at the reflective surface 208. They then pass through respective phase shifters 210 a second time and re-enter the multimode waveguide 204 for a second transit thereof. The phase shifters 210 apply phase shifts corresponding to twice their respective lengths. Modal dispersion again occurs in the multimode waveguide 204. If an appropriate set of phase shifts is applied by the phase shifters 210 to the four beams a single output beam may be formed appropriately located to enter a selected one of the input/output subsidiary waveguides. Alternatively, with a different set of phase shifts, four separate beams of substantially equal intensity may be formed appropriately located such that each enters a respective one of the input/output waveguides 202. Each separate beam propagates in the fundamental mode of the respective one of the input/output waveguides. The beams then pass down the waveguides 202 and excite the fibres 212.

Thus in the input or forward direction the waveguides 202, 204, 206 of the star coupler 200 operate respectively in the same way as the input, multimode and relay waveguides 18, 20 and 22 of the device 10.

Then in the output or return direction, after reflection at the surface 208, the waveguides 206, 204 and 202 operate respectively in the same way as the relay, second multimode and output waveguides 22, 24 and 28 of the device 10.

Figure 11:
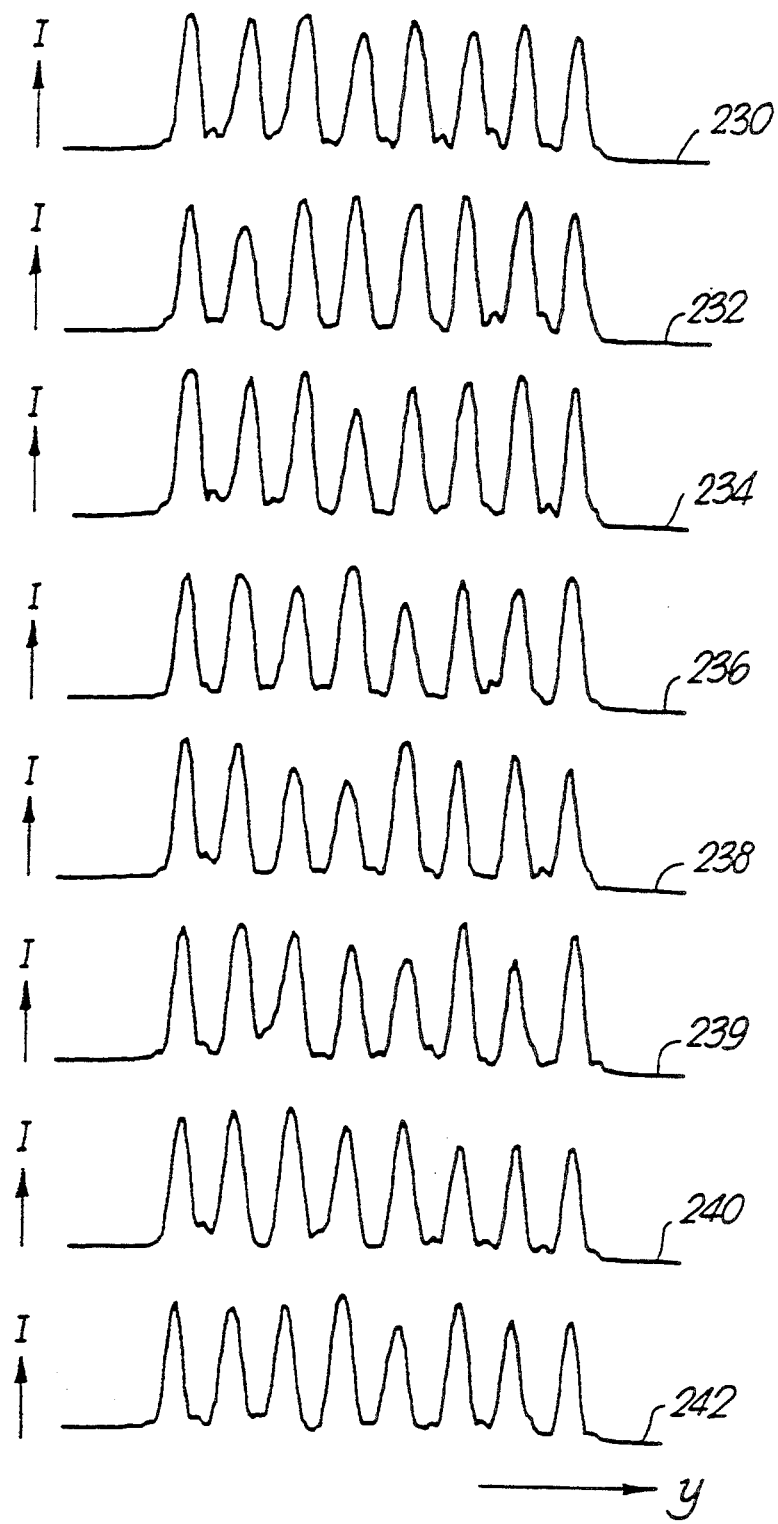
FIG. 11 graphically illustrates results from a ridge waveguide beamsplitter device.

Devices incorporating multimode waveguides have been constructed in the form of ridge waveguides in AeGaAs and subsequently tested. FIG. 11 graphically illustrates output intensity distributions measured at a cleared output face for one such device. The ridge waveguide device incorporates eight input waveguides, a multimode waveguide and eight output waveguides. The input and output waveguides are of square cross-section 2a×2a and the multimode waveguide is of rectangular cross-section 2a×2b and of length 2 L. The input and output waveguides have central axes located at the centres of respective eighths of the multimode waveguide width. That is these axes would intersect an equivalent of the y-axis 48 (see FIG. 1) at $y = -7b/8$, $-5b/8$, $-3b/8$, $-b/8$, $+b/8$, $+3b/8$, $+5b/8$ and $+7b/8$. The device is thus equivalent to half of an eight way version of the device described in relation to FIG. 1.

Graph 230 illustrates the output intensity distribution for a single input beam injected into the ridge waveguide device along its input waveguide associated with $y = -7b/8$. Similarly graphs 232 to 242 illustrate the output intensity for single input beams injected into the input waveguides associated with $y = -5b/8$, $y = -3b/8$, $y = -b/8$, $y = +b/8$, $y = +3b/8$, $y = +5b/8$ and $y = +7b/8$ respectively. Each graph illustrates that the respective input beam has been split into eight output beams of approximately equal intensity. Variations in output beam intensity are a result of slight inaccuracies in device production.

The foregoing description with reference to FIGS. 1 to 11 demonstrates that signal routing is achievable to locations in the width dimension of a rectangular waveguide. For example, in FIG. 3 the maxima 74a and 84a are laterally displaced relative to one another parallel to the y axis across the waveguide width. If beamsplitter and recombiner waveguides are constructed with heights sufficiently greater than 2a, then they will have a multimode structure in the x dimension in addition to that in the y dimension previously described. In particular, a square cross-section beamsplitter waveguide of height and width 2b=4a and length 2 L will convert an input waveguide fundamental $EH_{11}$ mode at y equal to $-3b/4$ at its input end to sixteen fundamental mode maxima at its output end. These maxima are arranged in a four by four square array. In this instance, two dimensional waveguide modes $EH_{mn}$ (m,n,=1,3,5 ...) are excited instead of only the one dimensional equivalents (m=1, n=1,3,5 ...) of FIGS. 1 to 11. Consideration of two versions of FIG. 3 at right angles to one another indicates that more complex routing is possible in two dimensions with appropriate location of inputs and outputs and phase control.

The foregoing remarks regarding square waveguides are extendable to rectangular waveguides. Beam division into K intensity maxima in a beamsplitter waveguide with appropriately located off-centre input and width dimension of width 2b occurs at a distance $L_K$ given by:

$$L_K = 16b^2/\lambda K \tag{10}$$

If the beamsplitter waveguide has an orthogonal width dimension of width 2a in which division into J intensity maxima is required, this will occur at a length $L_J$ given by:

$$L_J = 16a^2/\lambda J \tag{11}$$

If simultaneous division into J and K intensity maxima is required in mutually orthogonal transverse dimensions of the same length of waveguide, the waveguide cross-section dimensions b/a will be given by equating $L_J$ and $L_K$ and taking the square root as follows:

$$b/a = \sqrt{(K/J)} \tag{12}$$

In consequence beam division into a nine by four array of intensity maxima will occur in a rectangular beamsplitter waveguide with b equal to 3a/2 at a distance of $4a^2\lambda$.

A square or rectangular beamsplitter waveguide arranged as part of a two dimensional signal routing device may be employed with a reflector equivalent to the reflective surface 208 in FIG. 10, or alternatively it may be employed with a recombiner waveguide of like dimensions.

We claim:

1. A signal routing device for selectably routing a signal to at least one of any of a set of outputs, said device including:
   at least one subsidiary waveguide comprising a means for propagating substantially only fundamental mode radiation and for exciting a plurality of modes within a multimode waveguide;
   a set of relay waveguides comprising a means for propagating substantially only fundamental mode radiation;
   a multimode waveguide, optically coupled to said at least one subsidiary waveguide, and, in combination with said at least one subsidiary waveguide, comprising a means for modally dispersing radiation between each of said relay waveguides,
   phase shifting means for varying phase of radiation within each relay waveguide relative to radiation within the other relay waveguides and
   radiation redirecting means for redistributing radiation from aid relay waveguides to said at least one of any of a set of outputs, said set of relay waveguides, said phase shifting means and said radiation redirecting means in combination comprising a means for selectably routing radiation from said set of relay waveguides to said at least one of any of a set of outputs.

2. A device according to claim 1 wherein the multimode waveguide comprises a first multimode waveguide and the radiation redirecting means comprises a second multimode waveguide, said second multimode waveguide connected to a set of output ports.

3. A device according to claim 2 wherein the at least one subsidiary waveguide is a single waveguide connected coaxially to the first multimode waveguide and comprises a means for exciting only symmetric mode excitation of the first multimode waveguide.

4. A device according to claim 1 wherein the phase shifting means are transmissive.

5. A device according to claim 1 wherein said device is constructed from successively disposed strata, and wherein the waveguides have axes which are substantially parallel and coplanar.

6. A device according to claim 1 wherein the waveguides are ridge waveguides upstanding from a substrate.

7. A device according to claim 6 wherein said device is of a ternary semiconductor material system.

8. A device according to claim 7 wherein the semiconductor material system is $Al_x Ga_{1-x} As$.

9. A device according to claim 6 wherein the phase shifting means is electro-optical.

10. A device according to claim 1 wherein the relay waveguides are arranged in a two dimensional array and the multimode waveguide is arranged for two dimensional beam division.

11. A signal routing device for selectably routing a signal from at least one subsidiary waveguide operable in a fundamental mode to at least one of any of a set of outputs, said device including:
   a set of relay waveguides operable in a fundamental mode;
   a multimode waveguide including means for dividing intensity of fundamental mode radiation input to said waveguide from said at least one subsidiary waveguide between each of said relay waveguides,
   phase shifting means for varying phase of radiation within each relay waveguide relative to radiation within the other relay waveguides and
   radiation redirecting means for recombining radiation within the relay waveguides and applying said recombined radiation to said at least one of any of a set of outputs, wherein the multimode waveguide comprises a first multimode waveguide and the radiation redirecting means comprises a second multimode waveguide, said second multimode waveguide connected to a set of output ports wherein the at least one subsidiary waveguide comprises a set of subsidiary waveguides, each of said subsidiary waveguides located so as to comprise a means for exciting both symmetric and antisymmetric modes of the first multimode waveguide.

12. A device according to claim 4 wherein
   (a) the set of subsidiary waveguides, the set of relay waveguides and the set of output ports are of like cross-section, and
   (b) the first and second multimode waveguides are of the like dimensions.

13. A signal routing device for selectably routing a signal from at least one subsidiary waveguide operable in a fundamental mode to at least one of any of a set of outputs, said device including:
   a set of relay waveguides operable in a fundamental mode;
   a multimode waveguide including means for dividing intensity of fundamental mode radiation input to said waveguide from said at least one subsidiary waveguide between each of said relay waveguides,
   phase shifting means for varying phase of radiation within each relay waveguide relative to radiation within the other relay waveguides and
   radiation redirecting means for recombining radiation within the relay waveguides and applying said recombined radiation to said at least one of any of a set of outputs, wherein the radiation redirecting means comprises reflecting means for returning radiation through the relay waveguides for a second transit of the multimode waveguide.

14. A signal routing device for selectably routing a signal from at least one subsidiary waveguide operable in a fundamental mode to at least one of any of a set of outputs, said device including:
   a set of relay waveguides operable in a fundamental mode;
   a multimode waveguide including means for dividing intensity of fundamental mode radiation input to said waveguide from said at least one subsidiary waveguide between each of aid relay waveguides,
   phase shifting means for varying phase of radiation within each relay waveguide relative to radiation within the other relay waveguides and
   radiation redirecting means for recombining radiation within the relay waveguides and applying said recombined radiation to said at least one of any of a set of outputs, wherein said device is constructed of hollow ceramic material and for use with $CO_2$ laser radiation.

15. A device according to claim 14 wherein the phase shifting means are reflective.

16. A signal routing device including:
   (a) a first multimode waveguide,
   (b) a set of subsidiary waveguides, each subsidiary waveguide operable in a fundamental mode, the set of subsidiary waveguides including exciting means for exciting both symmetric and antisymmetric modes of the first multimode waveguide,
   (c) a set of relay waveguides, each relay waveguide operable in a fundamental mode, the first multimode waveguide and the set of subsidiary waveguides providing in combination means for dividing radiation within the subsidiary waveguides between each of the relay waveguides,
   (d) phase shifting means for providing variable phase radiation within each relay waveguide relative to the phase of radiation within the other relay waveguides, and
   (e) radiation redirecting means, connected to a set of output ports, comprising a second multimode waveguide, the relay waveguides and the radiation redirecting means, comprising in combination, redistribution means for redistributing radiation within the relay waveguides between said set of output ports.

17. A device according to claim 16 wherein said set of subsidiary waveguides, said set of relay waveguides and said of output ports are of like cross-section, and the first and second multimode waveguide are of like dimensions.

18. A signal routing device including:
   (a) a first multimode waveguide,
   (b) a set of subsidiary waveguides, each subsidiary waveguide operable in a fundamental mode, the set of subsidiary waveguides including exciting means for exciting the multimode waveguide,
   (c) a set of relay waveguides, each relay waveguide operable in a fundamental mode, the first multimode waveguide and the set of subsidiary waveguides providing in combination means for dividing radiation within the set of subsidiary waveguides between each of the relay waveguides,
   (d) phase shifting means for providing variable phase radiation within each relay waveguide relative to the phase of radiation within the other relay waveguides, and
   (e) reflecting means for returning radiation through the relay waveguides for a second transit of the multimode waveguide, the reflecting means, relay waveguides and multimode waveguide comprising in combination, redistribution means for redistributing the radiation within the relay waveguides between the subsidiary waveguides.

19. A signal routing device constructed of hollow ceramic material and for use with $CO_2$ laser radiation, the device including:
(a) a multimode waveguide,
(b) at least one subsidiary waveguide operable in a fundamental mode, said at least one waveguide providing input radiation to the multimode waveguide,
(c) a set of relay waveguides, each relay waveguide operable in a fundamental mode, said at least one subsidiary waveguide and said multimode waveguide comprising in combination, means for dividing the input radiation between each of the relay waveguides.
(d) phase shifting means for providing variable phase radiation within each relay waveguide relative to that of radiation within the other relay waveguides, and
(e) radiation redirecting means for redistributing radiation within the relay waveguides.

20. A device according to claim 19 wherein the phase shifting means are reflective.

21. A signal routing device including:
(a) a first multimode waveguide,
(b) a subsidiary waveguide optically coupled to said first multimode waveguide and providing waveguiding means for propagating therein substantially only fundamental mode radiation to said first multimode waveguide and also providing exciting means for exciting a plurality of modes of said first multimode waveguide,
(c) a set of relay waveguides providing waveguiding means for propagating within each thereof substantially one fundamental mode radiation excited thereby radiation from said first multimode waveguide, said subsidiary waveguide and said first multimode waveguide providing in combination means for modally dispersing and thereby dividing radiation between each of the relay waveguides,
(d) phase shifting means for providing variable phase radiation within each relay waveguide relative to the phase of radiation within the other relay waveguides,
(e) a second multimode waveguide, the set of relay waveguides providing means for exciting a plurality of modes within the second multimode waveguide, and
(f) a set of output waveguides, the relay waveguides and the second multimode waveguide comprising in combination means for modally dispersing and thereby redistributing radiation within the relay waveguides to one of said set of output waveguides,
wherein said first multimode waveguide, said subsidiary waveguide, said set of relay waveguides, said phase shifting means and said second multimode waveguide provide in combination signal routing means for selectably routing an input signal to one of said output waveguides and for changing such routing in response to operation of the phase shifting means.

22. A signal routing device according to claim 21 wherein the subsidiary waveguide is connected coaxially to the first multimode waveguide and wherein the subsidiary waveguide provides exciting means for exciting only symmetric modes of the first multimode waveguide.

23. A signal routing device including:
(a) a first multimode waveguide,
(b) a subsidiary waveguide optically coupled to said first multimode waveguide and providing waveguiding means for propagating therein radiation to said first multimode waveguide and also providing exciting means for exciting a plurality of modes of said first multimode waveguide,
(c) input means for exciting substantially only fundamental mode radiation within said subsidiary waveguide,
(d) a set of relay waveguides providing means for propagating substantially fundamental mode radiation excited therein by radiation from said first multimode waveguide, said subsidiary waveguide and said first multimode waveguide providing in combination means for modally dispersing and thereby dividing radiation received from said input means between each of the relay waveguides,
(e) phase shifting means for providing variable phase radiation within each relay waveguide relative to the phase of radiation within the other relay waveguides, and
(f) a second multimode waveguide, the set of relay waveguides providing means for exciting a plurality of modes within the second multimode waveguide, and
(g) a set of output waveguides, the set of relay waveguides and the second multimode waveguide comprising in combination means for modally dispersing and thereby redistributing radiation to one of said set of output waveguides,
wherein said first multimode waveguide, said subsidiary waveguide, said input means, said set of relay waveguides, said phase shifting means and said second multimode waveguide provide in combination signal routing means for selectably routing said input radiation to one of said set of output waveguides and for changing such routing in response to operation of the phase shifting means.

24. A signal routing device according to claim 23 wherein the subsidiary waveguide is connected coaxially to the first multimode waveguide and wherein the subsidiary waveguide provides exciting means for exciting only symmetric modes of the first multimode waveguide.

25. A signal routing device comprising:
(a) a first multimode waveguide,
(b) a subsidiary waveguide optically coupled to said first multimode waveguide and providing means for propagating substantially only fundamental mode radiation to said first multimode waveguide, the subsidiary waveguide providing exciting means for exciting a plurality of modes within the first multimode waveguide,
(c) a set of relay waveguides providing means for propagating substantially only fundamental mode radiation from the first multimode waveguide, said first multimode waveguide providing means for modally dispersing and thereby dividing radiation input to said first multimode waveguide between said set of relay waveguides,
(d) phase shifting means for providing variable phase radiation within each relay waveguide relative to the phase of radiation within the other relay waveguides, (e) a second multimode waveguide, and (f) a set of output ports, said second multimode waveguide providing means for modally dispersing and thereby redistributing radiation from the relay waveguides to one of said set of output ports, wherein the first multimode waveguide, the subsidiary waveguide, the set of relay waveguides, the phase shifting means and the second multimode waveguide provide in combination switching means for selectably and reconfigurably switching an input signal to one of said set of output ports.

26. A signal routing device comprising:

(a) a multimode waveguide, (b) a subsidiary waveguide optically coupled to said multimode waveguide and providing waveguiding means for propagating substantially only fundamental mode radiation to the multimode waveguide, the subsidiary waveguide providing exciting means for exciting a plurality of modes within the multimode waveguide, (c) a set of relay waveguides providing waveguiding means for propagating substantially only fundamental mode radiation from the multimode waveguide, said multimode waveguide providing means for modally dispersing and thereby dividing radiation input to it between the set of relay waveguides, (d) phase shifting means for providing variable phase radiation within each relay waveguide relative to the phase of radiation within the other relay waveguides, and (e) radiation redirecting means for redistributing radiation from the relay waveguides to one of a set of output waveguides.

27. A signal routing device including:

(a) a multimode waveguide, (b) a subsidiary waveguide optically coupled to said multimode waveguide and providing waveguiding means for propagating therein substantially only fundamental mode radiation to said multimode waveguide and also providing exciting means for exciting a plurality of modes of said multimode waveguide, (c) a set of relay waveguides providing waveguiding means for propagating therein substantially only fundamental mode radiation excited therein by radiation from said multimode waveguide, said subsidiary waveguide and said multimode waveguide providing in combination means for modally dispersing and thereby dividing radiation between each of the relay waveguides, (d) phase shifting means for providing variable phase radiation within each relay waveguide relative to the phase of radiation within the other relay waveguides, (e) radiation redirecting means, and (f) a set of outputs, the relay waveguides and the radiation redirecting means comprising in combination means for redistributing radiation within the relay waveguides to one of said set of outputs, wherein said multimode waveguide, said subsidiary waveguide, said set of relay waveguides, said phase shifting means and said radiation redirecting means provide in combination signal routing means for selectably routing an input signal to one of said outputs and for changing such routing in response to operation of the phase shifting means.

28. A signal routing device for selectably routing a signal to at least one of any of a set of outputs, said device including:

a multimode waveguide;

generating means for generating a constant phase, half-cycle sine wave radiation intensity maximum at a first end of said multimode waveguide and for exciting a plurality of modes in said multimode waveguide, a set of relay waveguides optically coupled to a second end of said multimode waveguide, said set of relay waveguides comprising means for propagating within each thereof substantially only fundamental mode radiation excited therein by radiation from said multimode waveguide, said generating means and said multimode waveguide in combination comprising means for modally dispersing radiation and thereby dividing said radiation between each of said relay waveguides;

phase shifting means for varying phase of radiation within each relay waveguide relative to radiation within the other relay waveguides; and radiation redirecting means for redistributing radiation from said relay waveguides to said at least one of any of a set of outputs, the set of relay waveguides, the phase shifting means and the radiation redirecting means in combination comprising means for selectably routing radiation from the set of relay waveguides to said at least one of any of a set of outputs.

* * * * *